United States Patent [19]

Pauze et al.

[11] 4,389,457
[45] Jun. 21, 1983

[54] HOT-MELT POLYESTERIMIDE-POLYISOCYANATE ELECTRICAL COATING COMPOSITIONS

[75] Inventors: Denis R. Pauze, Scotia; Otto S. Zamek, Schenectady, both of N.Y.

[73] Assignee: General Electric Company, Schenectady, N.Y.

[21] Appl. No.: 283,134

[22] Filed: Jul. 14, 1981

Related U.S. Application Data

[62] Division of Ser. No. 154,838, May 30, 1980, Pat. No. 4,296,229.

[51] Int. Cl.$^3$ .................... C08G 18/80; C08G 18/42; C08F 283/04
[52] U.S. Cl. .................................. 428/379; 427/118; 427/120; 428/380; 428/383; 428/425.8; 525/424; 528/45
[58] Field of Search ............ 428/379, 380, 383, 425.8; 528/45

[56] References Cited

U.S. PATENT DOCUMENTS

| | | | |
|---|---|---|---|
| 2,936,296 | 5/1960 | Precopio et al. | 260/33.4 |
| 2,982,754 | 5/1961 | Sheffer et al. | 260/33.4 |
| 3,211,585 | 10/1965 | Meyer et al. | 117/232 |
| 3,342,780 | 9/1967 | Meyer et al. | 260/75 |
| 3,426,098 | 2/1967 | Meyer et al. | 260/841 |
| 3,428,486 | 2/1969 | George | 117/218 |
| 3,493,413 | 2/1970 | Olson et al. | 117/218 |
| 3,555,113 | 1/1971 | Sattler | 528/45 |
| 3,578,639 | 5/1971 | Sheffer | 528/45 |
| 3,646,374 | 2/1972 | Jordan et al. | 310/45 |
| 3,697,471 | 10/1972 | Schmidt et al. | 260/33.4 P |
| 3,697,480 | 10/1972 | Schade et al. | 528/45 |
| 3,869,428 | 3/1975 | Mosimann et al. | 528/45 |
| 4,076,694 | 2/1978 | Zecher et al. | 528/45 |
| 4,088,637 | 5/1978 | Zecher et al. | 528/45 |
| 4,096,291 | 6/1978 | Dunwald et al. | 528/45 |
| 4,119,605 | 10/1978 | Keating | 260/33.2 R |
| 4,119,608 | 10/1978 | Keating | 528/188 |
| 4,119,758 | 10/1978 | Keating | 428/379 |
| 4,267,232 | 5/1981 | Schmidt et al. | 428/379 |
| 4,296,229 | 10/1981 | Pauze et al. | 428/379 |
| 4,319,006 | 3/1982 | Yamada et al. | 428/379 |

FOREIGN PATENT DOCUMENTS 2443252 3/1975 Fed. Rep. of Germany.

Primary Examiner—H. S. Cockeram
Attorney, Agent, or Firm—Hedman, Casella, Gibson & Costigan

[57] ABSTRACT

Hot-melt electrical coating compositions comprise high solids content polyesterimides prepared to an acid number of less than 6–7 in the presence of a monoether or monoester of a glycol or polyglycol and reacted hot with a blocked polyisocyanate. Such virtually solventless compositions provide insulation coatings on electrical conductors which have superior flexibility, especially after aging.

6 Claims, No Drawings

HOT-MELT POLYESTERIMIDE-POLYISOCYANATE ELECTRICAL COATING COMPOSITIONS

This is a division, of application Ser. No. 154,838 filed May 30, 1980, now U.S. Pat. No. 4,296,229.

This invention relates to high solids content polyesterimide-polyisocyanate coating compositions and to electrical conductors hot-melt coated therewith. More particularly, it is concerned with virtually solvent-free polyesterimides prepared in the presence of a small amount of a monoether or monoester of a glycol, or polyglycol, and thereafter heat reacted with a blocked polyisocyanate.

BACKGROUND OF THE INVENTION

Schmidt et al., U.S. Pat. No. 3,697,471, disclose a family of ester imide resins made by reacting together at least one polybasic acid or a functional derivative thereof, and at least one polyhydric alcohol or functional derivative thereof, at least one of the reactants having at least one five-membered imide ring between the functional groups of the molecule. It further discloses that the reactants can be heated in a commercial cresol mixture, then further diluted in a mixture of naphtha and cresol and used as an enamel for coating copper wire to produce a hard, thermally resistant insulation therefor. Meyer et al., U.S. Pat. No. 3,426,098, describe ester imide resins in which all or part of the polyhydric alcohol comprises tris(2-hydroxyethyl) isocyanurate.

Keating, U.S. Pat. Nos. 4,119,605, 4,119,608; and 4,119,758, incorporated herein by reference, discloses low molecular weight polyester-imide resins which are soluble in non-phenolic solvents by incorporating a monoether of a diethylene glycol or a triethylene glycol into the resin. Keating states that the use of the monoether of a glycol as a reactant serves to control the molecular weight and solubility of the polymer and permits the manufacture of wire enamels which contain relatively non-toxic solvents in place of phenols and also permits the attainment of enamels having economical high solids contents. Boldebuck, Banucci and Byrne in commonly-assigned copending application Ser. No. 867,939, filed Jan. 9, 1978, disclose a way of preparing virtually solvent-free polyesterimides, suitable for hot melt coating, by adding to the reaction mixture a monofunctional alcohol-reactant, such as decyl alcohol or a glycol ether.

Sheffer et al., U.S. Pat. No. 2,982,754, and Meyer et al., U.S. Pat. No. 3,211,585, describe cresylic acid-solubilized polyester-polyisocyanates for use as wire enamels.

Zamek, in commonly-assigned copending application Ser. No. 100,212, filed Dec. 4, 1979, describes in Example 5 the production of a partially completely reacted polyesterimide (acid number 6–7) and its reduction by a glycol ether solvent prior to reaction in solution with a blocked polyisocyanate to produce a coating composition which is an extremely viscous liquid at room temperature and has a solids content of 67.72%. It is stated to be adapted to be hot applied to copper wire at 80° C. The foregoing patents and applications are incorporated herein by reference.

It has now been discovered that virtually solventless reaction products of polyesterimides and blocked isocyanates can be made for use as wire enamels applied from the melt. As mentioned above, typically, wires are coated with enamels that are solutions of from 20 to 50% solids in cresylic acid and non-cresylic acid solvent systems. Application of those enamels require that the solvents be removed before cure and subsequently burned or released into the atmosphere. This procedure involves substantial use of energy and has environmental shortcomings. The present invention avoids these problems.

The hot melt polyesterimide component is produced herein by polymerization of the reactants at extremely high solids content (>75%) and direct isolation of the reaction product with blocked polyisocyanate at the end of the reaction. An important aspect of the invention is the production of a resin with the appropriate viscosity at the various hot melt applicator temperatures and the ability to add the necessary curing additives, e.g., the blocked polyisocyanate, to the polyester imide component at high temperature without the aid of a solvent. In the present invention, the use of a minimum amount of a glycol ether or ester, such as the monomethyl ether of diethylene glycol or the mono-n-butyl ether of diethylene glycol as a reaction mixture component aids in processing, e.g., the removal of volatile by-products and temperature control, and such monofunctional compounds function as a chain stopper limiting molecular weight and thus high temperature viscosity. The blocked polyisocyanates are introduced at higher than normally expected temperatures, even at 180° C. and, surprisingly, no premature cure is observed. In any case, it is preferred to employ a conventional transesterification catalyst, such as a titanate, and this can be added all in the beginning or some at the beginning and the balance at the end.

DESCRIPTION OF THE INVENTION

According to the present invention, there are provided compositions for hot-melt electrical wire coating comprising:

a high solids content resinous polyesterimidepolyisocyanate reaction product obtained by heating ingredients comprising:
(a) an aromatic diamine;
(b) an aromatic carboxylic anhydride containing at least one additional carboxylic group;
(c) terephthalic acid or a reactive derivative thereof;
(d) a polyhydric alcohol having at least three hydroxyl groups;
(e) an alkylene glycol; and a small amount of
(f)
  (i) an alkylene glycol monoether or monoester;
  (ii) a polyalkylene glycol monoether or monoester; or
  (iii) a mixture of (i) and (ii),
until an acid number of lower than 6 to 7 is attained, and adding to the hot reaction product a blocked polyisocyanate in an amount of 1 to 40 parts by weight per 100 parts by weight of the polyesterimide and blocked polyisocyanate.

Among the preferred features of the present invention are electrical coating compositions as defined above in which the solids content is at least 75 parts by weight; those in which heating is carried out at a temperature from about 188° to about 220° C., and the blocked polyisocyanate is added at a temperature of from about 120° C. to about 180° C.; and those which also include an alkyl titanate.

Also contemplated by the present invention are electrical conductors provided with a continuous coating of the new wire enamels, as a sole coat, or as an undercoat, or as an overcoat, and cured at elevated temperatures.

With respect to components (a)–(e) inclusive, these are conventional and well known to those skilled in this art by reason of the teachings, for example, in the above-mentioned U.S. Pat. No. 3,697,471 and 3,426,098.

By way of illustration, aromatic diamine component (a) can comprise benzidine, methylene dianiline, oxydianiline, diaminodiphenyl ketone, -sulfone, -sulfoxide, phenylene diamine, tolylene diamine, xylene diamine, and the like. Preferably, component (a) will comprise oxydianiline or methylenedianiline, and, especially preferably, methylenedianiline.

Illustratively, the aromatic carboxylic anhydride containing at least one additional carboxylic group component (b) can comprise pyromellitic anhydride, trimellitic anhydride, naphthalene tetracarboxylic dianhydride, benzophenone-2,3,2′,3′-tetracarboxylic dianhydride, and the like. The preferred components (b) are pyromellitic anhydride or trimellitic anhydride and especially trimellitic anhydride.

Typically, terephthalic acid or a di(lower) alkyl ester ($C_1$–$C_6$) or other reactive derivative, e.g., amide, acyl halide, etc., will be used as component (c). A minor amount of the terephthalic acid can be replaced with another dicarboxylic acid or derivative, e.g., isophthalic acid, benzophenone dicarboxylic acid, adipic acid, etc. Preferably component (a) will comprise dimethyl terephthalate or terephthalic acid, and especially preferably, terephthalic acid.

As additional polyester forming ingredient (d) there will be empolyed a polyhydric alcohol having at least three hydroxyl groups. There can be used glycerine, pentaerythritol, 1,1,1-trimethylolpropane, sorbitol, mannitol, dipentaerythritol, tris(2-hydroxyethyl-)isocyanurate (THEIC), and the like. Preferably as component (d) there will be used glycerine or tris(2-hydroxyethyl) isocyanurate, preferably the latter.

Illustratively, the alkylene glycol component (e) will comprise ethylene glycol, 1,4-butanediol, trimethylene glycol, propylene glycol, 1,5-pentanediol, 1,4-cyclohexane dimethanol and the like. Preferably, the alkylene glycol will be ethylene glycol.

The polar oxygenated reactant (f) having at least one active hydroxyl group will be selected from (i) an alkylene glycol monoether or monoester, such as ethylene glycol monomethyl ether, ethylene glycol mono-n-butyl ether, ethylene glycol monohexyl ether, ethylene glycol monoacetate, ethylene glycol monohexanoate, propylene glycol monomethyl ether, propylene glycol monoacetate, 1,4-butylene glycol mono-n-butyl ether, 1,6-hexylene glycol monomethyl ether, 2-phenoxy-2-propanol, and the like, and for (ii) a polyalkylene glycol monoether or monoester, such as diethylene glycol monoethyl ether, diethylene glycol mono-n-butyl ether, diethylene glycol monomethyl ether, diethylene glycol monoacetate, diethylene glycol monophenyl ether, triethylene glycol monoacetate, etc. Preferably, there will be used diethylene glycol monomethyl or diethylene glycol mono-n-butyl ethers or diethylene glycol monoethyl ethers.

The blocked polyisocyanates to be employed are known in the art, e.g., from the above-mentioned U.S. Pat. Nos. 2,982,754 and 3,211,585. The term "blocked" means that the polyisocyanate has been reacted with a group that will split off at the temperature employed with the polymeric ester imide. As polyisocyanate components there may be mentioned 2,4-tolylene diisocyanates; 2,6-tolylene diisocyanates; cyclopentylene diisocyanate; m-phenylene diisocyanate; p-phenylene diisocyanate; ethylene diisocyanate; butylidene diisocyanate; 1,5-naphthalene diisocyanate; 1,6-hexamethylene diisocyanate; dianisidene diisocyanate; 4,4′-diphenylether diisocyanate; 4,4′,4″-triphenylmethane diisocyanate (Desmodur R); the cyclic trimer of 2,4-tolylene diisocyanate; mixtures of the cyclic trimers of 2,4-tolylene diisocyanate and 2,6-tolylene diisocyanate; the trimer of 4,4′-diphenyl 2,4,6-triisocyanato toluene, and the like. Typical compounds which can be used to block the isocyanate groupings, e.g., by forming carbonates therewith, are monohydric phenols, such as phenol; meta-cresol; para-cresol; ortho cresol and mixtures thereof; the xylenols, e.g., 2,6-dimethylphenol; 4-ethyl phenol, 4-t-butylphenol; 2-butylphenol; 4-n-octylphenol; 4-isooctylphenol, etc., monohydric alcohols, such as methyl alcohol; ethyl alcohol, n-propyl alcohol, and the like, acetoacetic ester, hydroxyalkylcarbamic acid aryl esters, e.g., hydroxyethylcarbamic acid phenyl ester, mercaptans, e.g., 2-mercaptobenzothiazole, methyl mercaptans, and the like.

Others include the cyclic trimer of 2,4-tolylene diisocyanate having the isocyanate groups blocked with tertiary butyl alcohol or tertiary amyl alcohol or dimethyl ethinyl carbinol or acetoacetic acid ester or phenol or cresylic acid or ε-caprolactam or 2-mercaptobenzothiazole, or succinimide or phthalimide or diphenyl amine or phenyl-β-naphthylamine, triphenyl methane triisocyanate having the isocyanate groups blocked with phenol or mixed cresols or tertiary butyl alcohol or phthalimide, 1,3,3-pentanetriisocyanate having the isocyanate groups blocked with m-cresol, etc.

As specific examples of such blocked isocyanates there may also be mentioned Mondur S, wherein the isocyanate groups of the reaction product of 3 moles of mixed 2,4- and 2,6-tolylene diisocyanate with trimethylol propane are blocked by esterification with phenol and Mondur SH, wherein the mixed cyclic trimers of 2,4- and 2,6-tolylene diisocyanates have the three free isocyanates isocyanate groups blocked by esterification with m-cresol. Also preferred are alkanol-blocked polyisocyanates and special mention is made of Mobay's KL-57005, in this respect.

Suitable alkyl titanates include tetraisopropyl titanate, tetramethyl titanate, tetrabutyl titanate, tetrahexyltitanate, bis(acetoacetonyl)diisopropyl titanate and the like. Amounts will range from 0.2% to 1% present at the start of the reaction. Tetraisopropyl titanate is preferred.

In making the polyesterimide there should normally be an excess of alcohol groups over carboxyl groups in accordance with conventional practice. The preferred ratios of ingredients, and of ester groups to imide groups, are entirely conventional, see the patents cited above, and the especially preferred ratios of ingredients will be exemplified in detail hereinafter. The polyesterimide can be prepared in two ways, both of which will yield enamels with improved properties. In one manner of proceeding, all of the reactants are added to the vessel at the beginning of the polymerization. The reaction is carried out in the usual manner, e.g., under by-product distillation conditions, e.g., at 200° to 250° C., until the acid number drops below about 6–7 mg.KOH/per gram of sample, and preferably down to less than 1.0 then the reaction heating is discontinued, the blocked polyisocyanate is added to the hot mixture and it is maintained hot for the time needed to complete the reaction, e.g., 10-90 minutes, depending on the temperature. In another way, a two-stage reaction is conducted. First a hydroxyl rich polyester is prepared from ingredients (c), (d) and (e), and at the completion of this reaction, then ingredients (a), (b) and (f) are added and the reaction carried further under by-product distillation conditions until, the acid number again falls below 6-7, e.g. to 1.0 or below. Heating is discontinued, then the blocked polyisocyanate is again added to the hot reaction mixture, as before. In either case the preferred titanate can be added at the start of the reaction. The resin upon cooling to room temperature will either be a very viscous liquid or, more frequently, a solid.

Coatings prepared by using the compositions of the present invention have improved properties over glycol ether, or ester, based esterimides that have been prepared via reactions of the prior art. As has been mentioned, and as will be shown hereinafter, the flexibility retention is remarkably improved.

The wire enamels thus made are applied to an electrical conductor, e.g., copper, aluminum, silver or stainless steel wire, in conventional hot melt applications or by fluidized coating techniques, and the like. Illustratively, wire speeds of 15 to 65 feet/min. can be used with wire tower temperatures of 250° to 920° F. The build up of coating on the wire can be increased by repetitive passes through the resin composition. The coatings produced from the present enamels have excellent smoothness, flex retention or flexibility, continuity, solvent resistance, heat aging, dissipation factors, cut through resistance, heat shock, abrasion resistance and dielectric strength.

When used as an undercoat the enamels of this invention are applied to the conductor as above-mentioned, and built up to the conventional thickness, e.g., with multiple passes. Then a lesser wall of a different, overcoat enamel is applied. This can be, without limitation, a polyamide-imide, e.g., the heat reaction product of trimellitic anhydride and methylene dianiline diisocyanate, or an etherimide, a polyester, a nylon, an isocyanurated polyester, an isocyanurated polyester polyimide, and the like. When used as an overcoat, the enamels of this invention are applied as a lesser wall over a conductor previously provided with an undercoat of a different enamel, such as a polyester or a polyester imide, etc. Suitable second-type enamels are shown, e.g., in Precopio et al., U.S. Pat. No. 2,936,296; Meyer et al., U.S. Pat. No. 3,342,780; Meyer et al., U.S. Pat. No. 3,426,098; George, U.S. 3,428,486; and Olson et al., U.S. Pat. No. 3,493,413, all of which are incorporated herein by reference to save unnecessarily detailed description.

DESCRIPTION OF THE PREFERRED EMBODIMENTS

The following examples illustrate the present invention. They are not intended to limit the scope of the claims in any manner whatsoever.

EXAMPLE 1

A wire enamel is made by charging a suitably sized flask with the following reactants:

|  | Gms. |
| --- | --- |
| Ethylene glycol | 214.2 |
| Terephthalic acid | 582.53 |
| Tris(2-hydroxyethyl)isocyanurate | 820.71 |
| Tetraisopropyl titanate | 22.2 |
| Diethylene glycol monomethyl ether | 663.3 |
| Methylenedianiline | 298.08 |
| Trimellitic anhydride | 573.99 |

The contents are slowly heated with the evolution of water to a maximum temperature of 220° C. until no more distillate is evolved, and an acid number of 0.37 is achieved. The batch is cooled to 180° C. and there is added 66.6 g. of a blocked polyisocyanate comprising mixed cyclic trimers of 2,4- and 2,6-tolylene diisocyanates having the three free isocyanate groups blocked by esterification with m-cresol (Mobay Chemical Co., Mondur SH). The resin is stirred for an additional 30 min. while cooling and the hot resin is poured directly into cans. It is a solid at room temperature, has a solids content of 75% (after heating in an open dish at 200° C., for 1 hr.), and has a viscosity of 160 cps. at 150° C. It is hot applied to copper wire at 160° C., to produce a coated conductor with good continuity and acceptable surface.

EXAMPLE 2

A wire enamel is made by charging a suitably sized flask with Part I of the following reactants:

|  | Part | Grams |
| --- | --- | --- |
| Ethylene glycol | I | 321.3 |
| Terephthalic acid | I | 873.8 |
| Tris(2-hydroxyethyl)isocyanurate | I | 1231.1 |
| Tetraisopropyl titanate | I | 33.9 |
| Diethylene glycol monomethyl ether | II | 331.7 |
| Methylenedianiline | II | 447.1 |
| Trimellitic anhydride | II | 861.0 |

The contents are slowly heated with the evolution of water to a maximum temperature 208° C. until a clear resin of acid number 1.1 is obtained. The batch is cooled to 145°-150° C. and Part II is added. The heating is resumed to a maximum temperature of 213° C. and an acid number of less than 7 is obtained. The batch is cooled to 150° C. and 240.55 g of 40% solution of an alkanol-blocked polyisocyanate (Mobay KL5-7005) in diethylene glycol monomethyl ether is added. The resin is stirred for an additional 30 minutes and the hot resin is poured directly into cans. It is a solid at room temperature and has a solids content of 93.9%. It is applied from the melt at 170° C. to copper wire to produce a coated conductor.

The enamel is cured in a 15 foot vertical tower at 700° F. on 18 AWG copper magnet wire in 4 passes at 34 ft./min. to produce a coated wire. Properties are measured in conventional ways, and the results are set forth as follows:

| Wire Properties | |
| --- | --- |
| Dissipation Factor at 220° C. | 5.2 |
| Cut Thru °C. | 396 |
| Diel. Strength, kv | 8.2 |
| Heat Age, 21 hrs. at 175° C., 0% + | 3X |
| Repeat Scrape | 57 |

The flexibility retention of the enamels produced according to this invention is outstanding.

Dual coated wires are made in a tower as described above.

In the first, a base coat of a polyester of dimethyl terephthalate, ethylene glycol and glyerine made according to Precopio et al., U.S. Pat. No. 2,936,296 is applied to a build of about 2.3 mls. To this coating is then applied a thinner, 0.3 mil. over coating of the polyesterimide of the Example. A coated copper conductor according to this invention is obtained.

In the second, a wire coated with the polyesterimide of this invention (Example 1) has applied to it a thin outer coating of an amide-imide made by mixing and heating trimellitic anhydride and the diisocyanate of methylene dianiline. A coated copper conductor according to this invention is obtained.

It is obviously possible to make many variations in the present invention in light of the above, detailed description. For example, the alkyl titanate can be omitted. Phenol-formaldehyde resin can be added or it can be substituted with a melamine-formaldehyde resin. Metal driers can also be added, e.g., 0.2 to 1.0% based on total solids, of zinc octoate, cadmium linoleate, calcium octoate, and the like. Instead of the monomethyl ether of diethylene glycol used as co-reactant, there can be used the monobutyl ether of diethylene glycol. The following monoester alcohols can be used: ethylene glycol monoacetate and diethylene glycol monoacetate. All such obvious variations are within the full intended scope of the appended claims.

We claim:

1. An electrical conductor provided with a coating of a composition comprising a resinous reaction product obtained by heating ingredients comprising:
   (a) an aromatic diamine;
   (b) an aromatic carboxylic anhydride containing at least one additional carboxylic group;
   (c) terephthalic acid or a reactive derivative thereof;
   (d) a polyhydric alcohol having at least three hydroxyl groups;
   (e) an alkylene glycol; and
   (f) a small amount of
      (i) an alkylene glycol monoether or monoester;
      (ii) a polyalkylene glycol monoether or monoester; or
      (iii) a mixture of (i) and (ii),
until an acid number of lower than about 6 to about 7 is attained, and adding to the hot reaction product a blocked polyisocyanate in an amount of from about 1 to about 40 parts by weight per 100 parts by weight of the polyesterimide and blocked polyisocyanate.

2. An electrical conductor of claim 1, and a lesser wall of a second coating of a wire enamel of a different type covering said reaction product coating.

3. An electrical conductor of claim 1, provided with a first coating of a wire enamel which is free of said reaction product and a lesser wall of reaction product covering said first coatings of wire enamel.

4. An electrical conductor provided with a coating of a composition comprising a resinous reaction product obtained by heating at from about 180° C. to about 220° C. the ingredients comprising:
   (a) methylene dianiline;
   (b) trimellitic anhydride;
   (c) terephthalic acid;
   (d) tris(2-hydroxyethyl)isocyanate;
   (e) ethylene glycol; and
   (f) diethylene glycol monomethyl ether,
until an acid number of lower than 6 to 7 is attained, and adding to the hot reaction product at a temperature of from about 120° to about 180° C. a blocked polyisocyanate comprising mixed cyclic trimers of 2,4- and 2,6-tolylene diisocyanates having the three free isocyanate groups blocked by esterification with m-cresol or an alkanol of from 1 to 6 carbon atoms, the amount of blocked polyisocyanate being from 1 to 15 parts by weight per 100 parts by weight of the polyesterimide and the blocked polyisocyanate.

5. An electrical conductor of claim 4, and a lesser wall of second coating of a wire enamel of a different type covering said reaction product coating.

6. An electrical conductor of claim 4, provided first with a coating of a wire enamel which is free of said reaction product and a lesser wall of reaction product covering said first wire enamel.

* * * * *